(12) United States Patent
Smith (10) Patent No.: US 11,681,987 B1
(45) Date of Patent: Jun. 20, 2023

(54) DIGITAL TOUCHSCREEN WALL CALENDAR AND METHOD OF USE THEREOF

(71) Applicant: Antronio Smith, Columbia, SC (US)

(72) Inventor: Antronio Smith, Columbia, SC (US)

( * ) Notice: Subject to any disclaimer, the term of this patent is extended or adjusted under 35 U.S.C. 154(b) by 0 days.

(21) Appl. No.: 17/880,279

(22) Filed: Aug. 3, 2022

Related U.S. Application Data (60) Provisional application No. 63/349,201, filed on Jun. 6, 2022.

(51) Int. Cl.
   *G06Q 10/1093* (2023.01)
   *G06F 3/041* (2006.01)
   *G06F 3/16* (2006.01)

(52) U.S. Cl.
   CPC ....... *G06Q 10/1093* (2013.01); *G06F 3/0412* (2013.01); *G06F 3/16* (2013.01)

(58) Field of Classification Search
   CPC ...... G06F 3/16; G06F 3/0412; G06Q 10/1093
   USPC .................................................. 345/173, 174
   See application file for complete search history.

(56) References Cited

U.S. PATENT DOCUMENTS

| | | | | |
|---|---|---|---|---|
| 8,930,820 | B1* | 1/2015 | Elwell | G09D 3/12 |
| | | | | 715/963 |
| 2005/0134225 | A1* | 6/2005 | Mese | H01M 10/44 |
| | | | | 320/132 |
| 2016/0363912 | A1* | 12/2016 | Ashkenazi | G04G 13/021 |
| 2017/0090638 | A1* | 3/2017 | Vosgueritchian | G06F 3/04144 |
| 2021/0399911 | A1* | 12/2021 | Jorasch | H04L 65/403 |
| 2022/0083986 | A1* | 3/2022 | Duffy | G06Q 10/1097 |
| 2022/0343287 | A1* | 10/2022 | Kovatch | G06F 3/0488 |

\* cited by examiner

*Primary Examiner* — Calvin C Ma
(74) *Attorney, Agent, or Firm* — Brennan, Manna & Diamond, LLC (57) ABSTRACT

The present invention relates to a wall-mounted decorative digital calendar device designed to be hung on a wall of the home or office. The calendar device has a touchscreen display for displaying a calendar including dates, days, holiday information, daylight saving information, and other customized event information. The touchscreen also enables users to add information to the displayed calendar using a virtual keyboard. The device is configured to pair with a smartphone and a cloud storage for synchronizing calendar entries. The calendar device connects to a smartphone via Wi-Fi or Bluetooth, ensuring users can upload information to the calendar at any desired time and have it saved to a cloud database. The device eliminates the need for pen and paper or physical calendars, offering a much easier method of keeping track of birthdays, holidays, special events, and much more.

16 Claims, 7 Drawing Sheets

DIGITAL TOUCHSCREEN WALL CALENDAR AND METHOD OF USE THEREOF

CROSS-REFERENCE TO RELATED APPLICATION

The present application claims priority to, and the benefit of, U.S. Provisional Application No. 63/349,201, which was filed on Jun. 6, 2022 and is incorporated herein by reference in its entirety.

FIELD OF THE INVENTION

The present invention relates generally to the field of calendar devices. More specifically, the present invention relates to a glass wall-hung digital touchscreen calendar device. The calendar device displays a calendar that includes all holidays, events, and daylight savings information displayed, along with the ability to upload custom information to the calendar dates. The calendar device is configured to sync with one or more user devices and cloud storage for synchronizing calendar entries. Accordingly, the present disclosure makes specific reference thereto. Nonetheless, it is to be appreciated that aspects of the present invention are also equally applicable to other like applications, devices, and methods of manufacture.

BACKGROUND

By way of background, people use pen and paper calendars to keep track of important events and tasks, such as, birthdays, anniversaries, meetings, doctor's appointments, and more. In fact, paper calendars mark their existence in human lives for centuries. Currently, we follow the Gregorian calendars that date back to 1582. Generally, a calendar is used for identifying days: to be informed about a future event and to record an event that has happened. Also, a calendar may, by identifying a day, provide other useful information about the day such as its season and/or celebratory significance. Calendars are also used to help people manage their schedules, time, and activities, and more. People frequently use multiple systems for tracking important events and tasks and therefore, have trouble keeping track and also miss many important days.

Conventionally, people use wall calendars for organizing a schedule. Such wall calendars are also used for decorating a room. Wall calendars are generally hung-over walls of a room, a common area, or in an office space. These calendars offer convenient reminders of holidays and other important events. However, paper calendars do not provide automatic reminders and are time consuming to flip through.

Moreover, schedules are constantly updated, and accordingly the calendars must be updated to retain their value as organizational tools. Maintaining a calendar manually with all these changes is a near impossible task. Many people track their tasks by uploading calendar information in their smartphones, however, both paper calendars and calendars in smartphones have drawbacks that the information cannot be transferred to other electronic devices. While using paper calendars, the user must manually re-write reoccurring events, such as birthdays and anniversaries each year, which is a time consuming and tedious task. The updates and reminders are often forgotten before they can be handwritten on a paper calendar in the home which is a major drawback of the traditional paper calendar. People desire a much easier method of keeping track of important events while allowing synchronization of calendars between devices.

Therefore, there exists a long felt need in the art for an electronic calendar that provides same convenience and utility to the user as provided by a paper calendar. There is also a long felt need in the art for an electronic calendar that can be synced with other user devices, giving the user liberty to add reminders and updates to one calendar and thereafter access it on other digital calendars. Additionally, there is a long felt need in the art for an electronic calendar that can be hung on a wall similar to a conventional wall calendar. Moreover, there is a long felt need in the art for an electronic calendar that eliminates periodic purchasing of physical calendars. Further, there is a long felt need in the art for an electronic calendar that enables a user to access calendar information from anywhere. Furthermore, there is a long felt need in the art for an electronic calendar that enables users to quickly upload information to the calendar through the calendar itself or wirelessly through a paired electronic device. Finally, there is a long felt need in the art for a calendar system that eliminates the need for pen and paper or physical calendars, offering a much easier method of keeping track of important life events and tasks and much more.

The subject matter disclosed and claimed herein, in one embodiment thereof, comprises a wall-mounted digital calendar device. The digital calendar device is designed to keep track of important dates and information and provide audible and visual alerts of events. The device further comprising a touchscreen for displaying a calendar; the calendar displaying holidays, daylight saving information, and custom event information; the touchscreen is further configured to provide a virtual keyboard for receiving custom event information corresponding to a date; a wireless transceiver for establishing a wireless channel for pairing the calendar device with a handheld user device, wherein the calendar entries of a calendar application in the user device and calendar entries of the digital calendar device are synced; a plurality of speakers for playing out an event information and a push button for activating and deactivating the calendar device. The calendar device is configured to sync with external calendar applications such as calendar applications installed in a smartphone for synchronizing calendar entries.

In this manner, the novel wall-mounted digital electronic calendar of the present invention accomplishes all of the forgoing objectives and provides users with a touchscreen, wall-mounted digital calendar designed to keep track of important dates and information. The calendar can connect wirelessly to a smartphone allowing users to easily upload information which can be saved on a cloud storage allowing users to access information from anywhere. The digital calendar helps users to track events, reminders, information, meetings and more in a cost-effective and environment-friendly way.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a wall-mounted digital calendar device. The digital calendar device further comprising a touchscreen for displaying a calendar; the calendar displaying holidays, daylight saving information and custom event information; the touchscreen is further configured to provide a virtual keyboard for receiving custom event information corresponding to a date; a wireless transceiver for establishing a wireless channel for pairing the calendar device with a handheld user device, wherein the calendar entries of a calendar application in the user device and calendar entries of the digital calendar device are synced; a plurality of speakers for playing out an event information and a push button for activating and deactivating the calendar device.

In yet another embodiment, a wall-mounted digital calendar is disclosed. The digital calendar includes a memory module for storing holiday information, daylight saving information, and custom event information; a processor for retrieving said information for display on a touchscreen; a calendar configuration module configured to create a monthly calendar; a display module configured to display a calendar along with said holiday information, daylight saving information and custom event information; and a wireless transceiver for establishing a wireless channel for pairing the calendar device with a handheld user device, wherein the calendar entries of a calendar application in the user device and calendar entries of the digital calendar device are synced.

In yet another embodiment, the digital calendar may be configured to generate audible alerts/notifications played using one of the speakers installed in the housing. The audible alert/notifications may help the users to be reminded about appointments, events, and more before the particular event so that the users might not forget the event.

In yet another embodiment, the digital calendar may be configured to generate visual alerts/notifications displayed on touchscreen display screen. The visual alert/notifications help users to be reminded about appointments, events, and more before the particular event so that the users might not forget the event.

In yet another embodiment, a method of displaying calendar information of a smartphone calendar application on a wall-mounted digital calendar device is described. The method includes the steps of pairing the smartphone and the digital wall-mounted calendar device using a wireless communication channel; automatically syncing the calendar information of said smartphone and wall-mounted calendar; and, displaying the synced calendar information on touchscreen of the wall-mounted digital calendar device.

In yet another embodiment, the method further includes logging in calendar device and in the smartphone calendar application using same credentials.

In yet another embodiment, the method further includes syncing the wall-mounted digital calendar device with a calendar information stored in a cloud storage.

The advantage of the wall-mounted digital calendar of the present invention is that it provides an electronic calendar with a touchscreen display to allow users to easily update, add, and view events, reminders, and other important information. The electronic calendar has a large display that is visible from a distance. The digital calendar may further include daily, weekly, and monthly updates, audio alerts, visual alerts, and real-time reminders. The digital calendar also enables the users to sync the calendar information with other calendars, such as those stored on a smartphone.

Numerous other benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown.

Thus, in other embodiments, any of the features described herein from different embodiments may be combined.

As noted above, there is a long felt need in the art for an electronic calendar that provides same convenience and utility to the user as provided by a paper calendar. There is also a long felt need in the art for an electronic calendar that can be synced with other user devices, giving the user liberty to add reminders, updates to one calendar and access to same content on other digital calendars. Additionally, there is a long felt need in the art for an electronic calendar that can be hung on a wall similar to a conventional wall calendar. Moreover, there is a long felt need in the art for an electronic calendar that eliminates periodic purchasing of physical calendars. Further, there is a long felt need in the art for an electronic calendar that enables a user to access calendar information from anywhere. Furthermore, there is a long felt need in the art for an electronic calendar that enables users to quickly upload information to the calendar through the calendar itself or wirelessly through a paired electronic device. Finally, there is a long felt need in the art for a calendar system that eliminates the need for pen and paper or physical calendars, offering a much easier method of keeping track of important life events and tasks and much more.

The present invention, in one exemplary embodiment, is a wall-mounted digital calendar. The digital calendar includes a memory module for storing holiday information, daylight saving information and custom event information; a processor for retrieving said information for display on a touchscreen; a calendar configuration module configured to create a monthly calendar; a display module configured to display a calendar along with said holiday information, daylight saving information and custom event information; and a wireless transceiver for establishing a wireless channel for pairing the calendar device with a handheld user device, wherein the calendar entries of a calendar application in the user device and calendar entries of the digital calendar device are synced.

Figure 1:
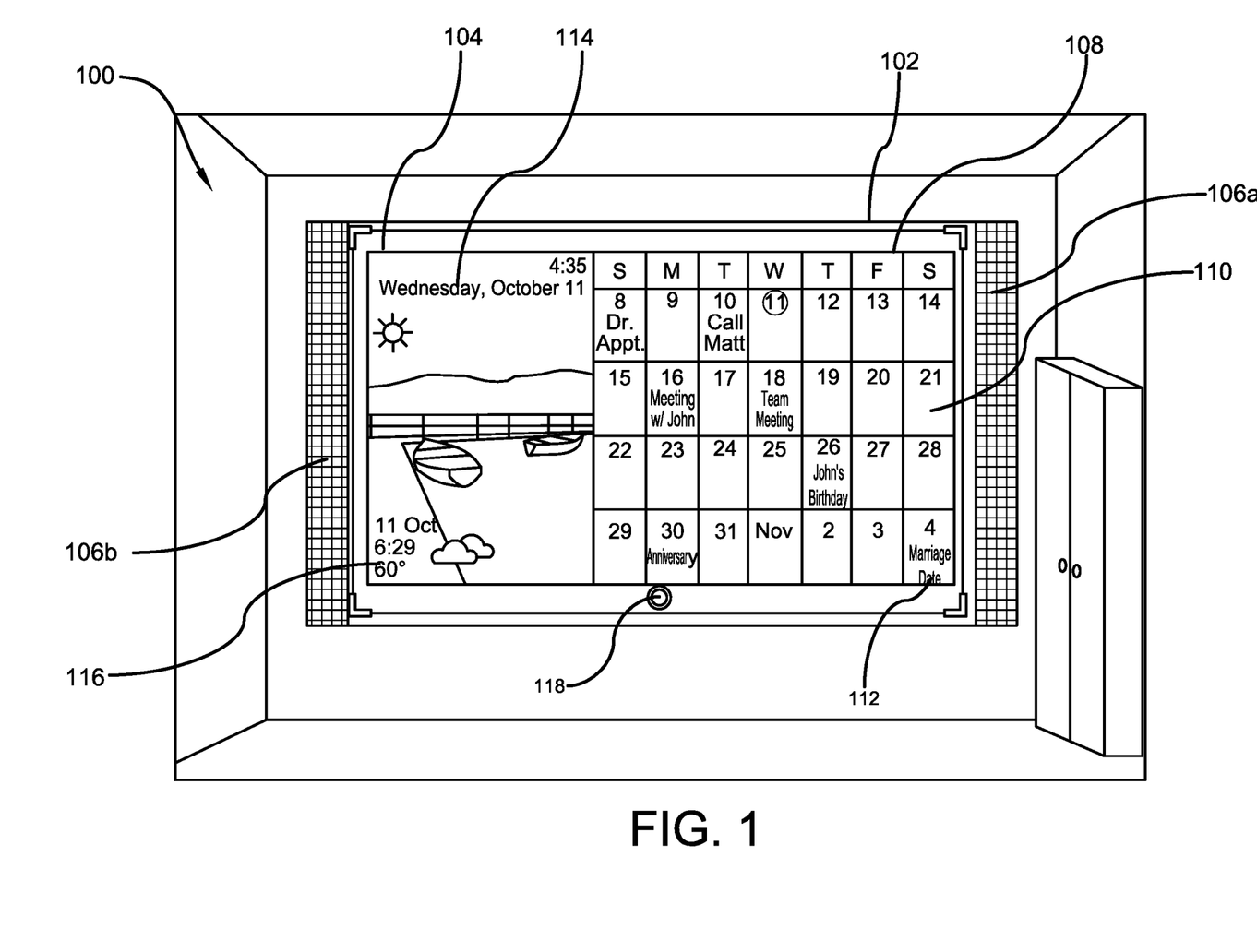
FIG. 1 illustrates a front perspective view of one potential embodiment of a wall-mounted digital calendar of the present invention in accordance with the disclosed architecture.

Referring initially to the drawings, FIG. 1 illustrates a front perspective view of one potential embodiment of the wall-mounted digital calendar of the present invention in accordance with the disclosed architecture. The wall-mounted digital calendar 100 of the present invention is designed as a stylish and decorative glass wall-hung digital touchscreen calendar that can be mounted to a wall surface in an easily accessible position in any room of a home or office. The digital calendar 100 has a housing 102 that stores electronic components (described in FIG. 3) and the display screen 104. The housing 102 is generally rectangular and has rounded edges, wherein the display screen 104 is made from a flat decorative glass.

The housing 102 can be made up of a durable material, such as, but not limited to, iron, aluminum, fiberglass, hardened plastic, chromed steel, stainless steel, and more. Embodiments of the present invention are intended to include or otherwise cover any type of the material for the housing 102 of the electronic calendar 100 including known, related art, and/or later developed technologies. Embodiments of the present invention are intended to include or otherwise cover any of the shape and the size for the digital calendar 100 including known, related art, and/or later developed technologies.

The display screen 104 is a touchscreen and is configured to enable a user to input information into the electronic calendar 100. The touchscreen user interface 104 is touch sensitive and provides an input interface and an output interface between the electronic calendar 100 and a user. The electronic calendar device 100 can have a bezel or alternatively can be bezel-less. The display screen 104 may use LCD (liquid crystal display) technology, or LPD (light emitting polymer display) technology, although other display technologies may be used in other embodiments.

The digital calendar 100 has one or more speakers 106a, 106b (hereinafter referred to as speakers 106) which are configured to generate an alert sound. In a preferred embodiment of the present invention, the alert sound may be an alert tone to remind the user of the electronic calendar 100 about upcoming meetings, events, special occasions, and more. According to embodiments of the present invention, the speakers 106 may be, but not limited to, an electro-dynamic speaker, an in-wall speaker, a flat panel speaker, a plasma arc speaker, a piezoelectric speaker, and so forth. Embodiments of the present invention are intended to include or otherwise cover any type of the speaker 106 including known, related art, and/or later developed technologies.

A calendar display 108 displaying individual dates 110 and events 112 associated with each date is displayed on the display screen 104. The calendar 108 can be monthly, weekly, bi-weekly and more as per preferences of a user. Further, current date, day, and time information 114 along with temperature information 116 is also displayed on the user interface. It should be appreciated that the format and layout of display of information can be hung and updated as per preferences of users of the digital calendar device 100 and the digital calendar 100 may provide a plurality of display options for selection by a user. The calendar display 108 is also configured to display all holidays and daylight savings information while users can also add customized information in the calendar display 108.

A push button 118 disposed on the housing 102 is used for switching on and off the calendar device 100 and is useful for saving energy. Further, in some embodiments, the push button 118 can also be used for dimming display light of the display screen 104.

Figure 2:
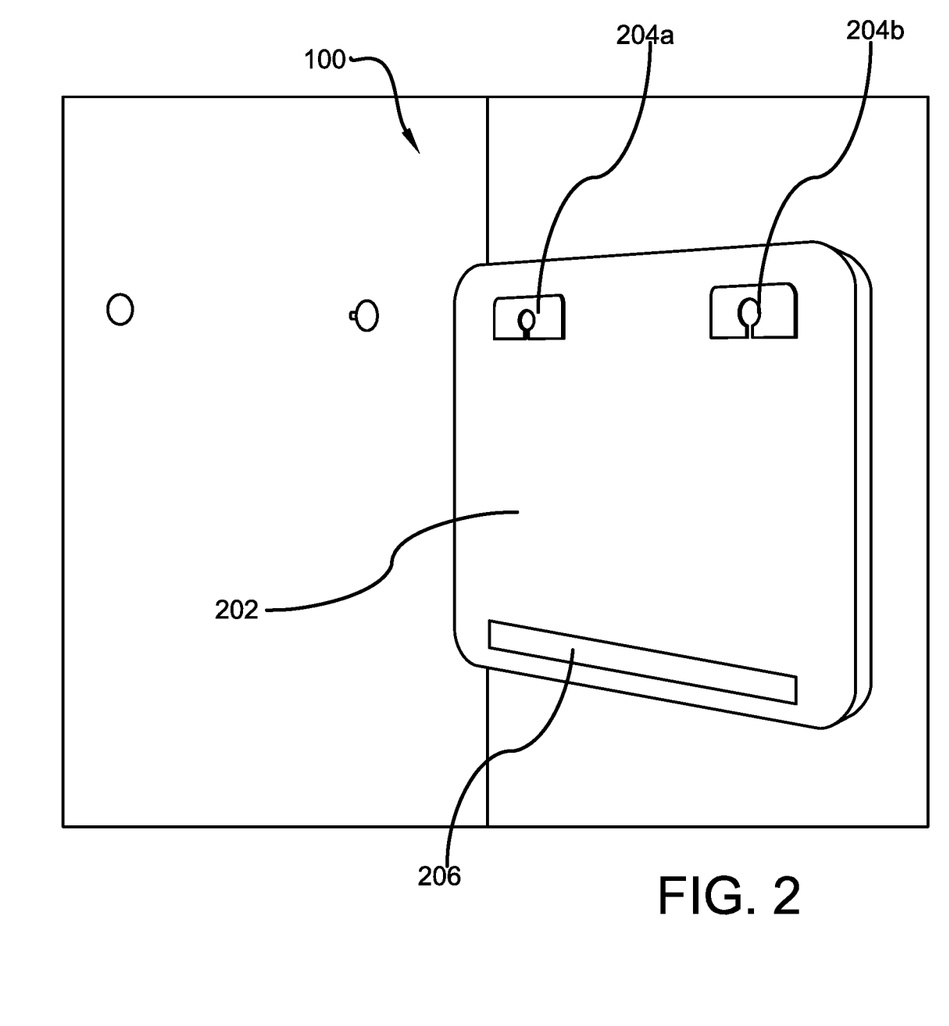
FIG. 2 illustrates a rear perspective view of the wall-mounted digital calendar of the present invention, in accordance with the disclosed architecture.

FIG. 2 illustrates a rear perspective view of the wall-mounted digital calendar 100 of the present invention, in accordance with the disclosed architecture. In the present embodiment, the rear view of the digital calendar 100 depicts a rear surface 202 of the housing 102. The rear surface 202 has a pair of brackets 204a, 204b for mounting the calendar device 100 to a wall. The brackets 204a, 204b can be made up of iron, aluminum, chromed steel, stainless steel, and more. The brackets 204a, 204b are configured to receive a nail head, thereby allowing the calendar 100 to rest upon the nail and securely mount to a wall. The rear surface 202 has a slot 206 for accommodating rechargeable batteries for providing electrical power to the digital calendar 100. It should be noted that in some embodiments, an external power supply such as from wall-mounted electric socket can be used for providing electrical power to the calendar 100.

Figure 3:
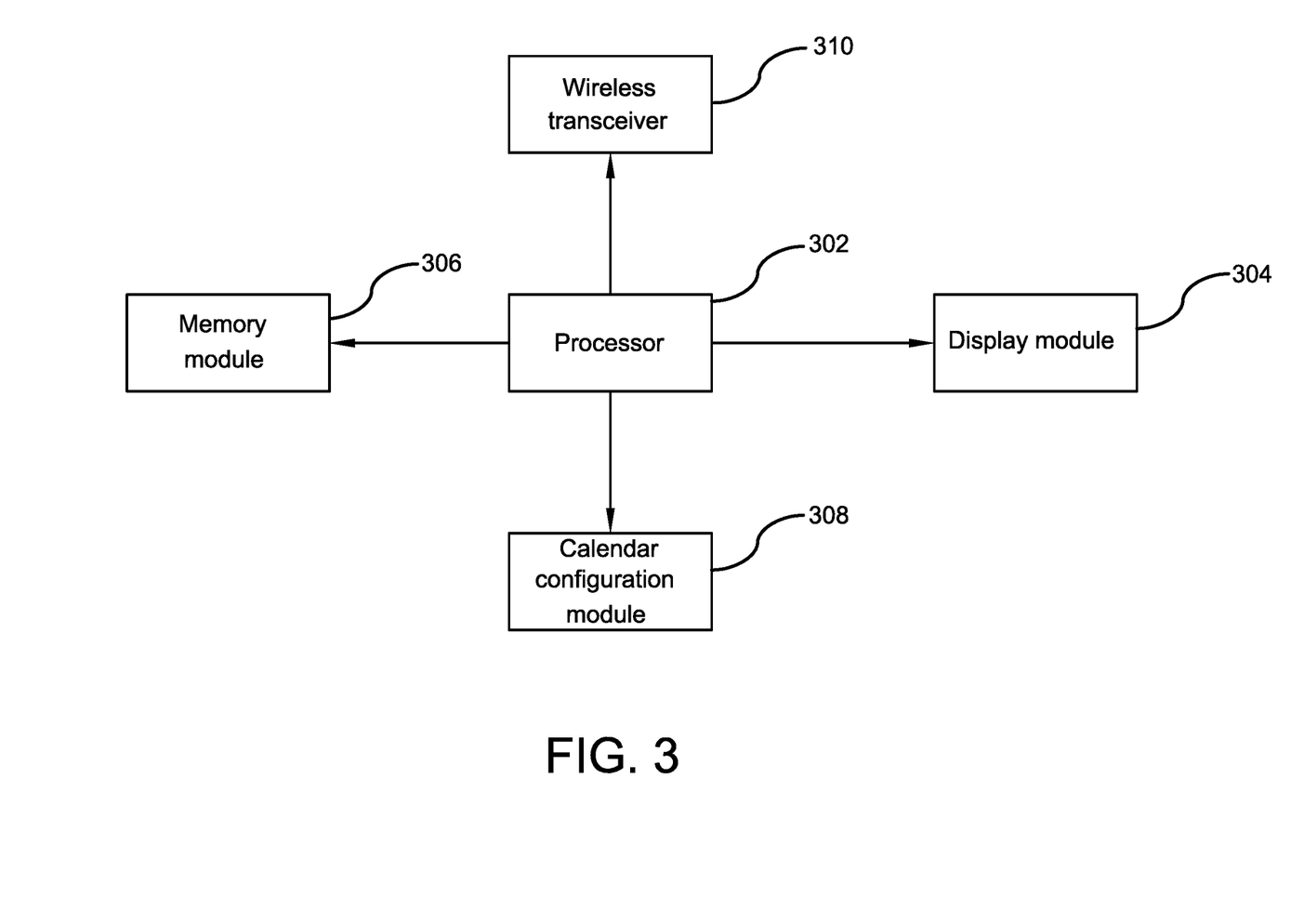
FIG. 3 illustrates a functional block diagram of the digital calendar showing the electronic components used for functionality of the calendar in accordance with the disclosed architecture.

FIG. 3 illustrates a functional block diagram of the digital calendar 100 showing the electronic components used for functionality of the calendar 100 in accordance with the disclosed architecture. A processor 302 is used for operating the calendar 100 and provides execution instructions to other components of the calendar 100. According to embodiments of the present invention, the processor 302 may be, but is not limited to, a Programmable Logic Control unit (PLC), a microcontroller, a microprocessor, a computing device, a development board, an ARDUINO development board, and more. Embodiments of the present invention are intended to include or otherwise cover any type of the processor 302 including known, related art, and/or later developed technologies that may be capable of processing the received data.

A display module 304 is configured to detect contact and any movement on the display screen 104 by a finger of a user or by a stylus and is configured to convert the detected contact into interaction with calendar display 108 displayed on the display screen. The display module 304 provides input interface and output interface to the user allowing a user to enter input through the touchscreen and enables the touchscreen to display the calendar.

A memory module 306 is configured to store calendar and meeting information of the calendar device 100 and may include random-access memory (RAM), read-only memory (ROM), and any other suitable volatile or non-volatile memory or storage device. New information added to the calendar is stored in the memory module 306 and the processor 302 is configured to retrieve information stored in the memory module 306 for processing to generate notifications, display calendar, and more.

A calendar configuration module 308 generates calendar display 108 in various formats like monthly, weekly, and more. Further, the module 308 is configured to display current time, date, temperature, and more on the display screen 104.

Figure 4:
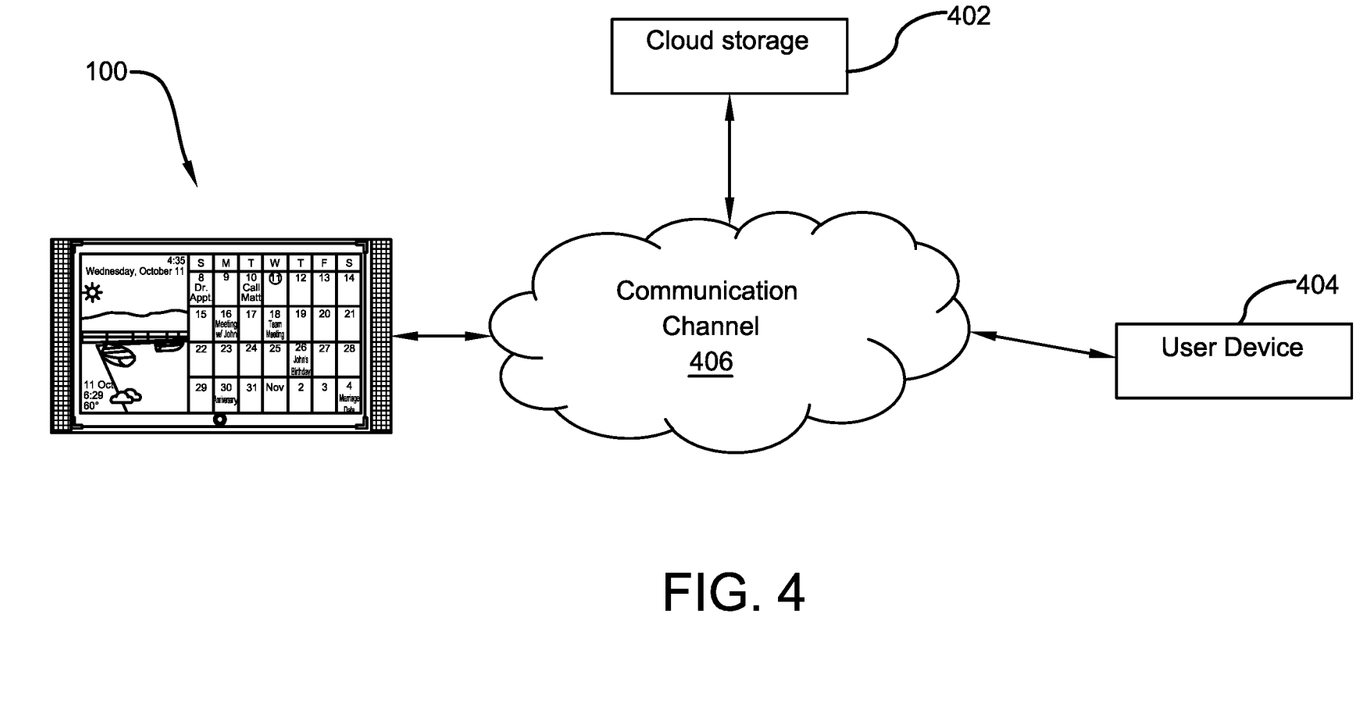
FIG. 4 illustrates a schematic view showing wireless connection of a smartphone and a cloud storage with the digital calendar of the present invention in accordance with the disclosed architecture.

The wireless transceiver 310 of the digital calendar 100 enables the calendar 100 to couple to a smartphone as illustrated in FIG. 4 for syncing calendar information. Further, the wireless transceiver 310 also enables the calendar 100 to sync calendar information with a cloud storage. For example, the information entries made by a user in a smartphone calendar can be synced with the digital calendar 100 and the wireless transmission of the information is facilitated by the wireless transceiver 310. According to embodiments of the present invention, the wireless transceiver 310 can in the form of an integrated chip and may be, but not limited to, a Bluetooth device, an Infrared (IR) device, Global System for Mobile Communication (GSM) device, a Code-Division Multiple Access (CDMA) device, a Near Field Communication (NFC) device, and so forth. In a preferred embodiment of the present invention, the wireless transceiver 310 can be a Wireless Fidelity (Wi-Fi) device.

FIG. 4 illustrates a schematic view showing wireless connection of a smartphone and a cloud storage with the digital calendar of the present invention in accordance with the disclosed architecture. As described earlier, the calendar 100 can sync with a calendar of a smartphone and also with a calendar stored in a cloud storage. The digital calendar 100 of the present invention is configured to be hung in an indoor environment on a wall and can connect to one or more cloud storage 402, and one or more user device 404 for synchronization of the calendar entries through a communication channel 406.

The communication channel 406 may include a data network such as, but not limited to, an Internet, a Local Area Network (LAN), a Wide Area Network (WAN), a Metropolitan Area Network (MAN), and so forth. In some embodiments of the present invention, the communication network 106 may include a wireless network, such as, but not limited to, a cellular network, and may employ various technologies including an Enhanced Data Rates for Global Evolution (EDGE), a General Packet Radio Service (GPRS), and so forth. In some embodiments of the present invention, the communication channel 106 may include or otherwise cover networks or sub-networks, each of which may include, for example, a wired or a wireless data pathway. In preferred embodiment of the present invention, the communication channel is Low Energy Bluetooth or Wi-Fi channel.

The user device 404 may have a calendar application that receives and transmits calendar data for synchronization with the electronic calendar 100. In an exemplary scenario, a user login into the electronic calendar 100 to sync calendar entries with the calendar of the smartphone 404 and cloud storage 402. The login credentials allow the software application to connect to the mail server 302. The synchronization of calendars of the digital calendar 100 and the smartphone 404 can be direct without involving cloud storage 402 or alternatively can be via the cloud storage 402. According to embodiments of the present invention, the user device 404 may be, but are not limited to, a mobile device, a smartphone, a tablet computer, a portable computer, a laptop computer, a desktop computer, a smart device, a smartwatch, and so forth. The cloud storage 402 enables a user to access the calendar entries virtually from anywhere on the smartphone 404.

Figure 5:
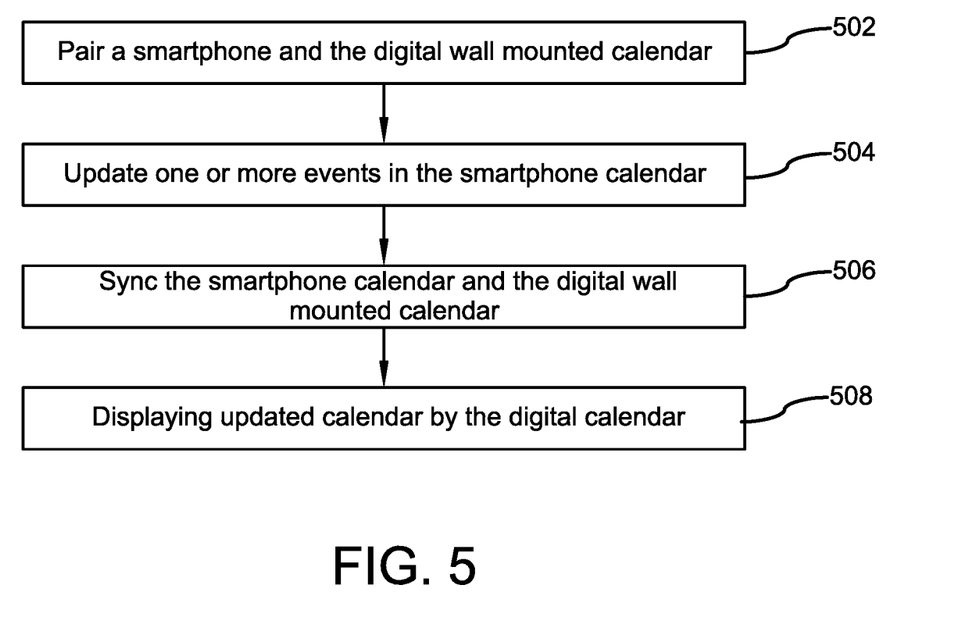
FIG. 5 illustrates a flow diagram depicting exemplary steps performed in synchronization of the calendar entries of the digital calendar and smartphone in accordance with the disclosed architecture.

FIG. 5 illustrates a flow diagram depicting exemplary steps performed in synchronization of the calendar entries of the digital calendar 100 and smartphone 404 in accordance with the disclosed architecture. In the method of the present embodiment, initially, in step 502, the electronic calendar 100 and a smartphone is paired using a wireless channel. Based on user preferences, one or more events are updated in the smartphone calendar in step 504. It should be noted that the smartphone calendar and the digital calendar are different and a user may want to sync the calendars. The digital calendar and the smartphone calendar are synced either by using a sync button positioned on the display screen of the digital calendar 100 or automatically when the digital calendar device and the smartphone are paired (Step 506). Finally, the updated and synced calendar is displayed on the digital calendar and on the smartphone calendar (Step 508).

It should be noted that a user profile is created and logged in the digital calendar 100 and same user's profile is also logged in the paired smartphone allowing calendars of a single user is synced in the wall-mounted calendar 100 and the smartphone calendar.

Figure 6:
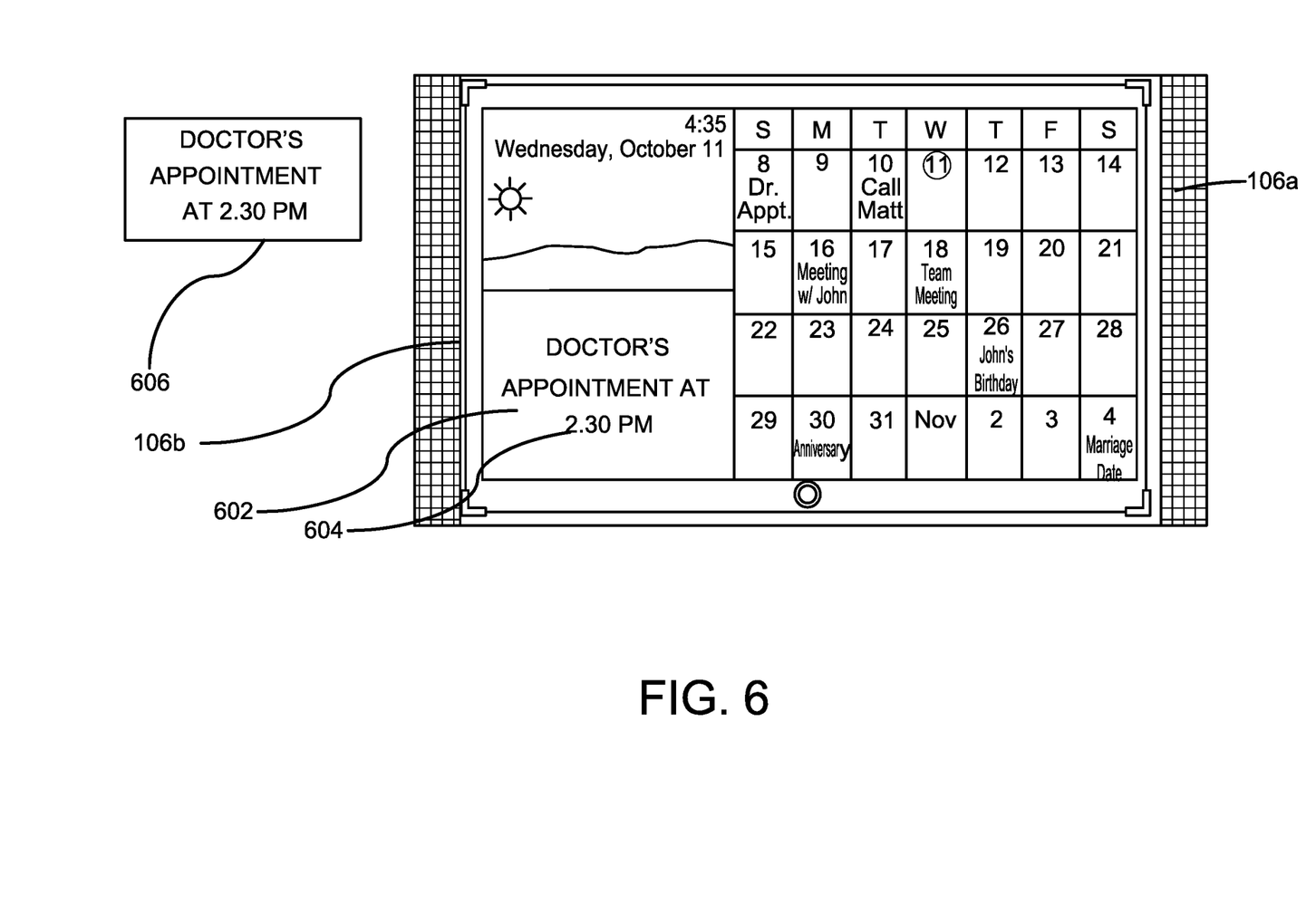
FIG. 6 illustrates a perspective view showing the wall-mounted digital calendar showing a visual and audio alert for a doctor's appointment to a user in accordance with the disclosed architecture.

FIG. 6 illustrates a perspective view showing the wall-mounted digital calendar 100 showing a visual and audio alert for a doctor's appointment to a user in accordance with the disclosed architecture. The wall-mounted calendar 100 is configured to provide a visual alert 602 for an event/meeting such as a doctor's appointment 604. The visual alert 602 can be displayed in a form of a pop-up. Simultaneously, an audio alert 606 is played out by speakers 106a, 106b for alerting the user. Both visual and audio alerts are conveyed to the user with a personalized message comprising the details of the event. The details for the doctor's appointment can displayed and played out with the message "DOCTOR'S APPOINTMENT AT 2:30 PM". Additional information such as doctor name or place can also be displayed to the user based on the information stored in the electronic calendar 100 while creating the event.

Figure 7:
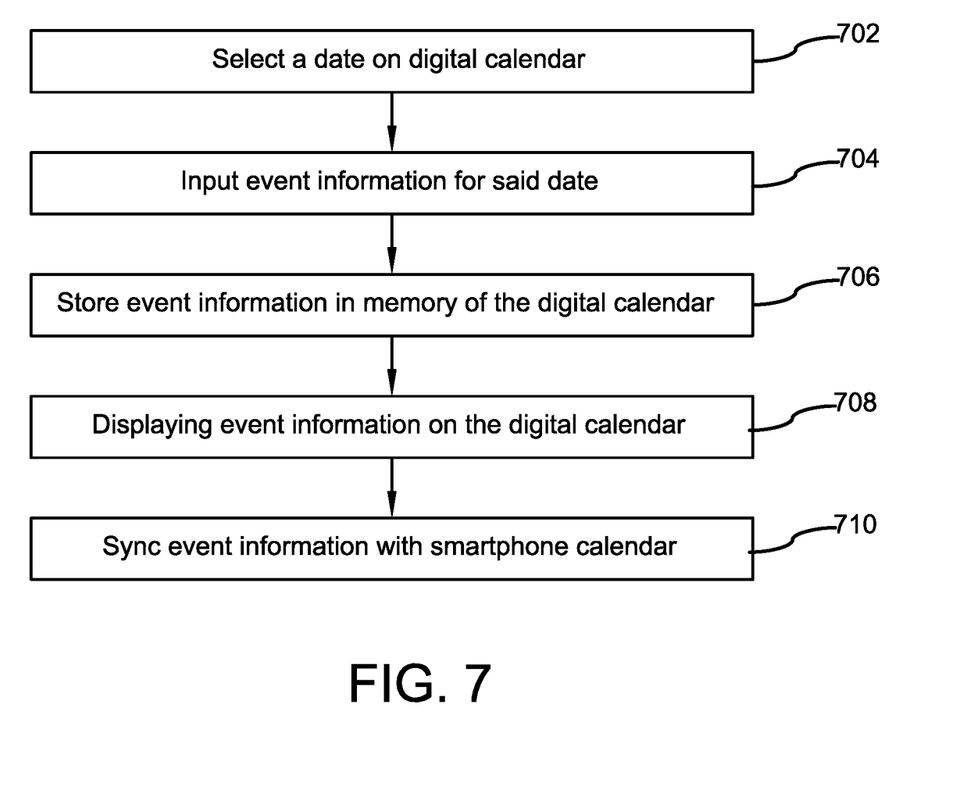
FIG. 7 illustrates a flow diagram depicting a process of including an event on a specific date in the digital calendar of the present invention in accordance with the disclosed architecture.

FIG. 7 illustrates a flow diagram depicting a process of including an event on a specific date in the digital calendar 100 of the present invention in accordance with the disclosed architecture. Initially, a date is selected on the digital calendar using the touchscreen (Step 702). Any date of any month can be selected by a user on the calendar. Then, an event information for the selected date is input by the user using the touchscreen (Step 704). The calendar displays a user interface including a virtual keyboard for inputting information. The received event information is stored in memory of the digital calendar device (Step 706) and accordingly, the event information is displayed on the corresponding date on the calendar display (Step 708). Finally, the event information is synced with a smartphone calendar stored in a paired smartphone and with a calendar stored in a cloud storage (Step 710).

Certain terms are used throughout the following description and claims to refer to particular features or components. As one skilled in the art will appreciate, different persons may refer to the same feature or component by different names. This document does not intend to distinguish between components or features that differ in name, but not structure or function. As used herein "digital calendar", "wall-mounted digital calendar device", "digital calendar device", and "calendar" are interchangeable and refer to the wall-mounted digital calendar device 100 of the present invention.

Notwithstanding the forgoing, the wall-mounted digital calendar device 100 of the present invention can be of any suitable size and configuration as is known in the art without affecting the overall concept of the invention, provided that it accomplishes the above stated objectives. One of ordinary skill in the art will appreciate that the wall-mounted digital calendar device 100 as shown in the FIGS. are for illustrative purposes only, and that many other sizes and shapes of the wall-mounted digital calendar device 100 are well within the scope of the present disclosure. Although the dimensions of the wall-mounted digital calendar device 100 are important design parameters for user convenience, the wall-mounted digital calendar device 100 be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A digital calendar comprising:
   a touchscreen electronic calendar having a housing and a display screen for mounting to a wall surface;
   wherein said display screen having a flat glass;
   wherein said touchscreen having a touch sensitive input interface and an output interface between said electronic calendar and a user for inputting calendar information into said electronic calenda, and wherein said touchscreen is activatable via a bezel;
   a speaker mounted to said housing for emitting alert sounds to alert to upcoming events;
   wherein said display screen displays individual dates and said upcoming events associated with said individual dates on a selective display comprising a monthly display, a weekly display, a bi-weekly display, a daily display, and daylight savings information;
   a display module for detecting contact on said display screen by the user for converting said detected contact into interaction with said display screen;
   a memory module for storing said individual dates and said upcoming events;
   a calendar configuration module for generating a calendar display having a monthly, weekly, and daily display options;
   a processor for operating said electronic calendar and executing instructions to said display module, said memory module, and said calendar configuration module; and
   a wireless transceiver for coupling and syncing said electronic calendar to a smartphone for syncing said calendar information.

2. The digital calendar of claim 1, wherein said wireless transceiver syncs said calendar information with a cloud storage.

3. The digital calendar of claim 2, wherein said wireless transceiver is selected from a group consisting of a Bluetooth device, an Infrared (IR) device, a Global System for Mobile Communication (GSM) device, a Code-Division Multiple Access (CDMA) device, and a Near Field Communication (NFC) device.

4. The digital calendar of claim 2, wherein said wireless transceiver having a Wireless Fidelity (Wi-Fi) device for syncing said electronic calendar to said calendar information.

5. The digital calendar of claim 4, wherein said display screen is selected from a group consisting of LCD (liquid crystal display) technology and LPD (light emitting polymer display) technology.

6. The digital calendar of claim 4, wherein said upcoming events are selected from a group consisting of a meeting, an event, and an occasion.

7. The digital calendar of claim 6, wherein said speaker is selected from a group consisting of an electro-dynamic speaker, an in-wall speaker, a flat panel speaker, a plasma arc speaker, and a piezoelectric speaker.

8. The digital calendar of claim 7, wherein said selective display includes date, day, and time information.

9. The digital calendar of claim 8 further comprising a dimmer switch for dimming a display light of said display screen.

10. The digital calendar of claim 8, wherein said housing includes rechargeable batteries for providing electrical power to said electronic calendar.

11. The digital calendar of claim 8, wherein said calendar display having a current time, a current date, and a current temperature.

12. The digital calendar of claim 11, wherein said processor is selected from a group consisting of a Programmable Logic Control unit (PLC), a microcontroller, a microprocessor, a computing device, a development board, and an ARDUINO development board.

13. A digital calendar comprising:
   a touchscreen electronic calendar having a housing and a display screen for mounting to a wall surface;
   wherein said display screen having a flat glass;

wherein said touchscreen having a touch sensitive input interface and an output interface between said electronic calendar and a user for inputting calendar information into said electronic calendar;

wherein the touch sensitive input interface is configured to provide a virtual keyboard for inputting information;

a speaker mounted to said housing for emitting alert sounds to alert to upcoming events;

wherein said display screen displays individual dates and said upcoming events associated with said individual dates on a selective display comprising a monthly display, a weekly display, a bi-weekly display, a daily display, and daylight savings information;

a display module for detecting contact on said display screen by the user for converting said detected contact into interaction with said display screen;

a memory module for storing said individual dates and said upcoming events;

a calendar configuration module for generating a calendar display having a monthly, weekly, and daily display options;

a processor for operating said electronic calendar and executing instructions to said display module, said memory module, and said calendar configuration module;

a wireless transceiver for coupling and syncing said electronic calendar to a smartphone for syncing said calendar information;

a communication channel for syncing a calendar of said smartphone, a calendar of a cloud storage, and a calendar of said electronic calendar; and a sync button located on the display screen for manually syncing said calendar information.

14. The digital calendar of claim 13, wherein said display screen is selected from a group consisting of LCD (liquid crystal display) technology and LPD (light emitting polymer display) technology.

15. The digital calendar of claim 13, wherein said upcoming events are selected from a group consisting of a meeting, an event, and an occasion.

16. The digital calendar of claim 13, wherein said calendar display having a current time, a current date, and a current temperature.

* * * * *